United States Patent
Liu (10) Patent No.: US 10,346,155 B1
(45) Date of Patent: Jul. 9, 2019

(54) COMPILATION OPTIMIZATION VIA DYNAMIC SERVER CLONING

(71) Applicant: SAP SE, Walldorf (DE)

(72) Inventor: Ying Liu, Chengdu (CN)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 15/857,661

(22) Filed: Dec. 29, 2017

(51) Int. Cl.
*G06F 9/44* (2018.01)
*G06F 8/65* (2018.01)

(52) U.S. Cl.
CPC ..................................... *G06F 8/65* (2013.01)

(58) Field of Classification Search
USPC ......................................... 717/120, 140–148
See application file for complete search history.

(56) References Cited

U.S. PATENT DOCUMENTS

2008/0120350 A1* 5/2008 Grabowski ....... G06F 17/30067

* cited by examiner

*Primary Examiner* — Chuck O Kendall
(74) *Attorney, Agent, or Firm* — Buckley, Maschoff & Talwalkar LLC (57) ABSTRACT

Various embodiments of systems and methods to optimize compilation in distributed software projects via dynamic server cloning are described herein. The described techniques include receiving a compilation request comprising an update of a software product of a distributed software development project. Further, in one aspect, a server node clone is instantiated, e.g., from a resource pool, based on a server template. The server template corresponds to a latest successful compilation of the software product. In another aspect, the update of the software product is incrementally applied on the latest compilation at the server node clone. Once the update of the software product at the server node clone is confirmed as successful, the server template is updated to the build of the software product at the server node clone. The server node clone is subsequently released to the resource pool to free up the consumed resources.

18 Claims, 6 Drawing Sheets

COMPILATION OPTIMIZATION VIA DYNAMIC SERVER CLONING

BACKGROUND

In large scale software development projects, a common scenario is multiple developers working in parallel on one or more integrated software applications to provide specific services for customers. The supporting technology has advanced dramatically in recent years, providing tools to coordinate and orchestrate such distributed software development processes. Thus, developers are able to incrementally and independently, to large extent, add and test new functionalities to new or existing software projects. The available tools ensure low risks of creating discrepancies, and provide efficient version control. Examples for distributed version control systems include Perforce® (P4), Git®, GitHub®, etc. However, managing the distributed development in large scale software projects, and the efficient merging of the new functionality into the developed applications address only some of the challenges. Before developers merge the code updates they submit into a master code, the code shall be automatically compiled and tested as part of the continuous integration and continuous delivery (CI/CD) pipeline. Only submissions with successful results of this process can be merged into the master code. Submissions with failed results will be blocked. This process guarantees the correctness and availability of the basic master code. Since the software product is a monolithic program, the automated compiling time take a lot of time that impacts the efficiency of developers. A developer has to wait for centralized compile resources availability. Compile duration itself may take too long, since typically the compile resources are fixed and a developer may have to wait additionally when submissions are dense during high activity periods, while the compile resources may idling in periods with low activity. Often, the parallel submission of new functionality for centralized compilation and testing not only compete for resources, but also create discrepancies between the different versions of the software project, which as a result extends further the time for compilation and building the developed application (or applications).

BRIEF DESCRIPTION OF THE DRAWINGS

The claims set forth the scope with particularity. The embodiments are illustrated by way of example and not by way of limitation in the figures of the accompanying drawings where like references indicate similar elements. The embodiments, together with their advantages, may be best understood from the following detailed description taken in conjunction with the accompanying drawings.

DETAILED DESCRIPTION

Embodiments of techniques for optimization of compilation in distributed software projects via dynamic server cloning are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

One way for software developers to check the operability and quality of the generated source code, e.g., in distributed software development projects, is by using test services. An efficient test service, e.g., Unit Test (UT) services developed by SAP®, provides testing infrastructure where newly developed source code is added to a compiled software product, and the new functionality is tested. A test service may include a client layer (e.g., UT Client) where a developer or a user may provide or submit newly developed source code, monitor and interact with the testing process, etc. For example, various tools may be available at the client for submitting source code to the test service.

Further, the test service may include a server layer (e.g., UT Server), where, for example, newly developed software code is submitted via the client, compiled and merged to a larger software product/project. The merging at the server may be managed by a source code management system or a revision control system such as Perforce, Git, GitHub, etc. In one embodiment, the server layer may include a build agent and/or a test agent, e.g., deployed on one or more distributed servers. The efficiency of the distributed development process may largely depend on the timeliness of compiling and testing the newly developed changes.

Figure 1:
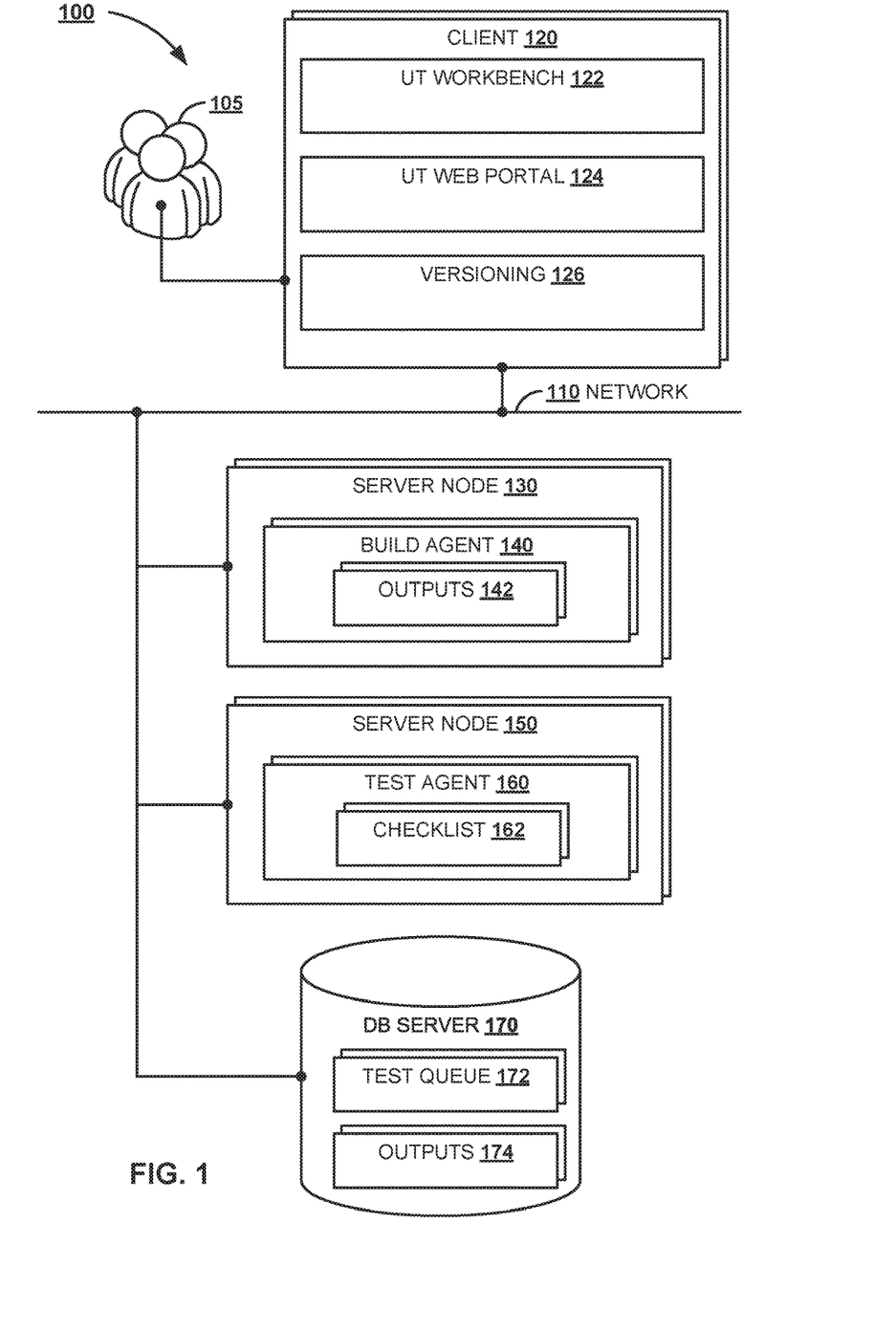
FIG. 1 is a block diagram illustrating a system that executes automated compiling and tests process of CI/CD pipeline, according to one embodiment.

FIG. 1 is a block diagram showing system 100 implementing an efficient distributed development process to execute automated compiling and tests process of CI/CD pipeline. As illustrated, a number of stakeholders (e.g., developers, users 105) via clients such as client 120 connect to a number of server nodes such as server node 130 and server node 150 via network 110. The distributed environment may be enclosed, e.g., on premise. In such a case, network 110 may be an intranet. Alternatively, the development environment may be at least partially exposed and accessible over secured public connectivity services (the Internet), e.g., by using publicly available resources such as cloud.

Client 120 may include tools such as UT workbench 122 providing means to prepare, organize, execute, report and document tests, such as the tests of newly developed functionalities within a distributed development environment.

UT workbench 122 may be a tool a developer use to submit her or his code, the developer may interact with the tool for her/his own submissions. UT Web portal 124 may be a web center multiple developers can access through browsers and view submissions and relevant information, besides their own submissions. Versioning tool 126 may provide an interface to a version control system to coordinate the merging of the successfully tested functionalities to a particular version of the software product being developed.

A newly developed software functionality may be submitted, e.g., by the developer, via the client 120 for testing. For example, the new functionality and a test scenario may be uploaded to a test queue at the backend, e.g., one or more the server nodes (130 and 150). In one embodiment, the test queues formed by submitted new functionalities (e.g., and corresponding test scenarios) may be stored on a separate storage, such as test queue 172 stored on database (DB) server 170. On a server node, e.g., server node 130, an instance of build agent (e.g., various build scripts) 140 may receive or pull the newly submitted software, e.g., from the test queue 172, and prepare a new build of the currently developed software product. The new build may include a number of output files (e.g. 142). Output files may be binary files to be executed at the server node creating the build. An instance of test agent 160 may pull or poll the test queue 172 and retrieve appropriate test requests, e.g., according to some criteria, to test the new functionality added to the prepared build. Based on the test requests, the test agent 160 may generate or store one or more checklists (e.g., 162) to be executed before accepting the new functionality and, e.g., adding it to the next software product version.

Depending on the implementation, test agent 160 may run on a separate server node (130) from the server where the build agent 140 is running, e.g., 150. The build agent 140 may store the output files at the DB server 170 (e.g., outputs 174), where they may be accessed and executed by other server nodes. In one embodiment, the instances of build agent 140 run on a plurality of physical server nodes. The turnover of compilation and testing of new software functionalities may depend on the availability of free server nodes. Accordingly, the more physical server nodes are running, the better the availability would be.

In a shared or distributed development environment, where multiple developers create or update source code and new functionalities, the compilation process is critical for the efficiency and speed of development. When no previous build output is present, running a client build target will compile and bind the entire software project application (software product), including building (or rebuilding) the different program modules. This may be called a full or a clean build. Subsequently, the build agent (e.g., 140) may compare newly submitted source code (files) to an available previously generated output files (e.g., the latest full build) to detect what is changed. Hence, the build agent can minimize the update to only the affected output files, e.g., recompiling only the portions of the software product that have been modifies or otherwise affected by the newly submitted source code. This may be called an incremental build. An incremental build is performed automatically as long as the output of a previous build is present. Accordingly, the incremental build may be much faster than a full build.

Even when the changes are added to the developed software product incrementally, the compilation is time consuming. This is especially so when multiple different functionalities are added simultaneously (or near simultaneously) to the software project that is developed. For example, when the compilation is performed to a distributed set of physical machines (e.g., multiple nodes such as server node 130), a separate build may be created on each of the involved physical servers. In such an environment, when a new code is provided, e.g., a submission request is received, a random and idle compiler (e.g., build agent) running on idle server node is assigned to execute the compilation.

Often, the assigned physical server may not store or access the latest build, and hence, the new functionality may rely on output files that are unavailable at the server. This would require additional tasks to fetch the missing changes upon which is developed the provided new source code. That may extend the compile time significantly, as the output files have to be additionally updated before applying the newly received changes. Such build may be called rough incremental build. In one embodiment, rough incremental builds could be avoided by ensuring that a server assigned to compile and test new source code changes, contains or accesses the latest output files and can directly apply the updates based on the received changes. Such build may be called precise incremental build.

For example, incremental build is based on a previous successful build (e.g., binary output files generated during a full compilation of the software project that is developed and/or maintained). Generally, the process of incremental build includes making successfully a full build first. Thus, a set of output files is generated. Then, a developer may make changes to the source code that have been compiled, and trigger a build upon the existing earlier generated files. Accordingly, if another change to the software is made, e.g., by a second developer, over the changes provided by the first developer, the subsequent incremental build would be a rough incremental build if the second changes are applied over the initial set of output files, and would be a precise incremental build when the second changes are applied to the build including the output files updated with the first changes.

Accordingly, to avoid rough incremental builds, a latest set of output file may be stored at DB server 170 (e.g., outputs 174) and/or replicated between the set of server nodes (e.g., 130) where the developers compile their source code changes. For example, corresponding procedure running in the software project development environment may update the outputs 174 whenever a new functionality is successfully tested. Such an update may be run independently or in coordination with a version control system. When a new functionality is submitted for compilation and testing, and randomly distributed to a compilation server node (130), the server node (e.g., the build agent 140) may first verify that the outputs (e.g., 142) needed for the incremental build at the node (e.g., 130) are the latest, e.g., correspond to the outputs 174 at DB server 170.

Further, to even better ensure precise incremental builds, a distribution of newly submitted changes for compilation to a random server node of the set of server nodes should be avoided, where the different server nodes may store outputs in different state. This can be achieved by working with virtual server nodes instead of physical ones. Thus, when a developer submits changes to the shared software project, a new instance of a virtual server may be generated with the latest output files of the project, and the changes can be routed for compilation to that server. Furthermore, the previous compilations of the project, e.g., before the latest successful one, can be removed to avoid accidental rough incremental builds. An additional advantage of using virtual servers is the opportunity for better scaling, depending on how many developers are generating software changes and requesting compilations at a particular time period. There are systems, e.g., virtual machine (VM) management and VM scheduler, that can allocate resources corresponding to the current load to avoid idling and/or overloading the existing physical servers. The schedule mechanism these systems provide is similar, for example, to some Cloud based architectures, such as Kubernetes®.

Figure 2:
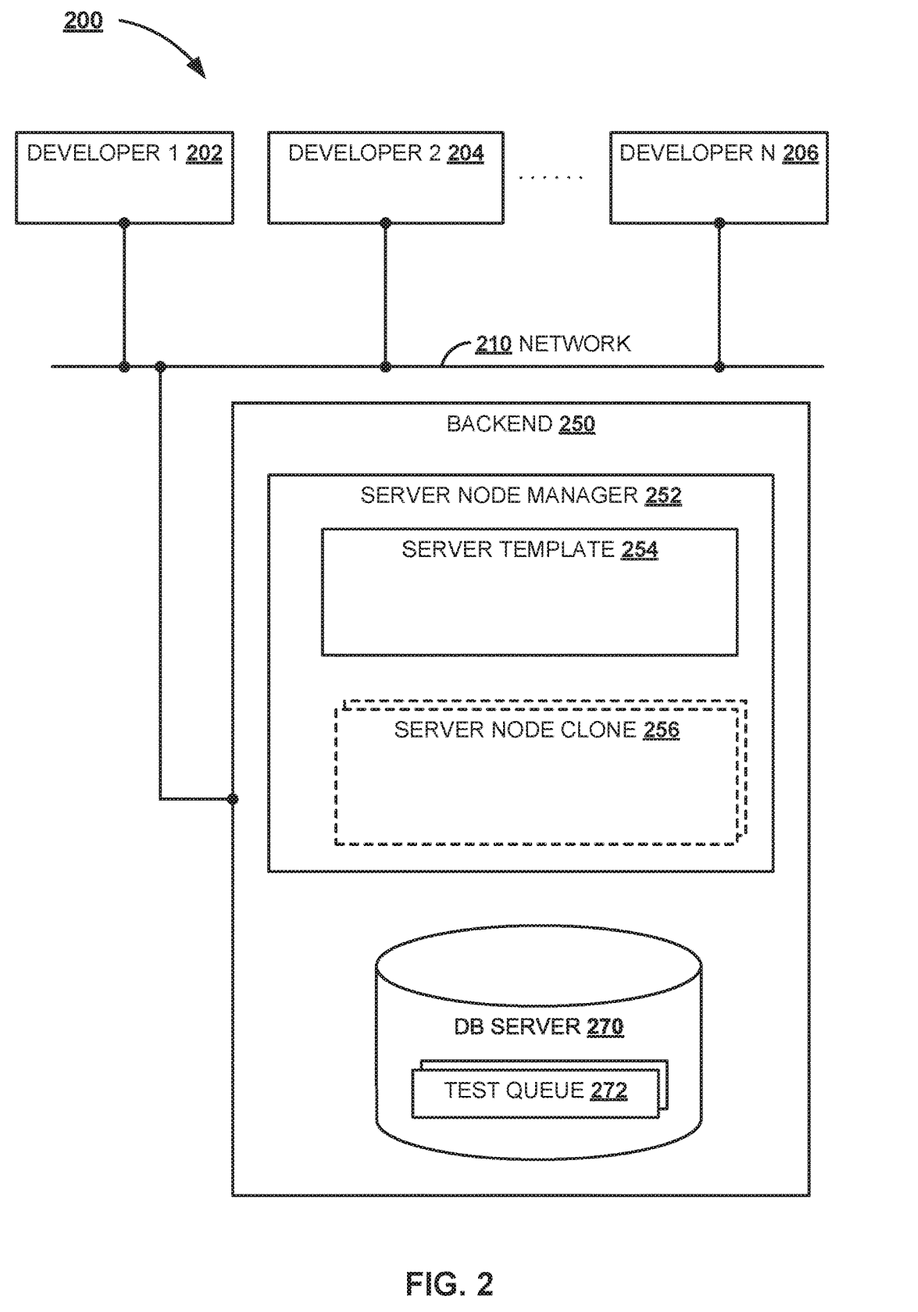
FIG. 2 is a block diagram illustrating a system environment to provide compilation optimization via dynamic server cloning, according to one embodiment.

FIG. 2 is a block diagram of system environment 200 to provide compilation optimization via dynamic server cloning. As illustrated, a number of developers 202-206 connect to backend 250 via network 210 to collaborate on a distributed software development project (not illustrated). Developers 202-206 may represent client systems where one or more stakeholders such as developers, testers, controllers, etc., may access the software project, e.g., to generate and submit source code, test scenarios, monitor different processes, etc.

The backend 250 may include or may be connected to DB server 270. In one embodiment, DB server 270 may be a separate system, e.g., storage, logically and/or physically distinct from backend 250. The connection between backend 250 and DB server 270 may be direct, and/or may be established via network 210. In one embodiment, DB server 270 may represent DB Service as a part of the backend that is not physically separate, instead it may be logically separate. DB Service may collaborate with other backend services. Network 210 may support different protocols, and may be private and/or publicly accessible. Generally, backend 250 and DB server 270 may be either on-premise or cloud provided resources, or a combination of both. FIG. 2 does not illustrate the distributed software project itself, e.g., the building and executing environments, versioning control, testing tools, etc. What is shown is server node manager 252 to replicate or clone backend server nodes, e.g., server node clone 256. The server node clone 256 may be a virtual machine and may represent a virtual backend server node similar in functionality to the physical backend server nodes 130 and 150 illustrated in FIG. 1. In one embodiment, the server node manager 252 generates or creates server node clones (e.g., 256) based on server template 254. The number of generated server node clones (256) may depend on current load or demand, and availability of resources.

By adopting virtual compilers, the server nodes can be auto scaled depending on load, to achieve precise incremental build in distributed development environments. A resource pool, e.g., managed by the server node manager 252, may be used for dynamically cloning and releasing compilers on demand (e.g., server node clones 256). A template with the latest successful full build, such as server template 254, may be stored to enable the cloning. In one embodiment, server template 254 and/or server node clones 256 can mount space at DB server 270, and use it as a storage, e.g. a file system. Thus, for example, output files and other data of server template 254 and server node clones 256 may be stored on DB server. In one embodiment, when a developer submits a new source code for compiling and testing (e.g., at test queue 272), server node manager 252 may dynamically generate a server node to handle the compilation and testing by cloning the server template 254, namely, server node clone 256. Once the compiling and testing are done, the server node clone 256 may be released to the resource pool.

Figure 3:
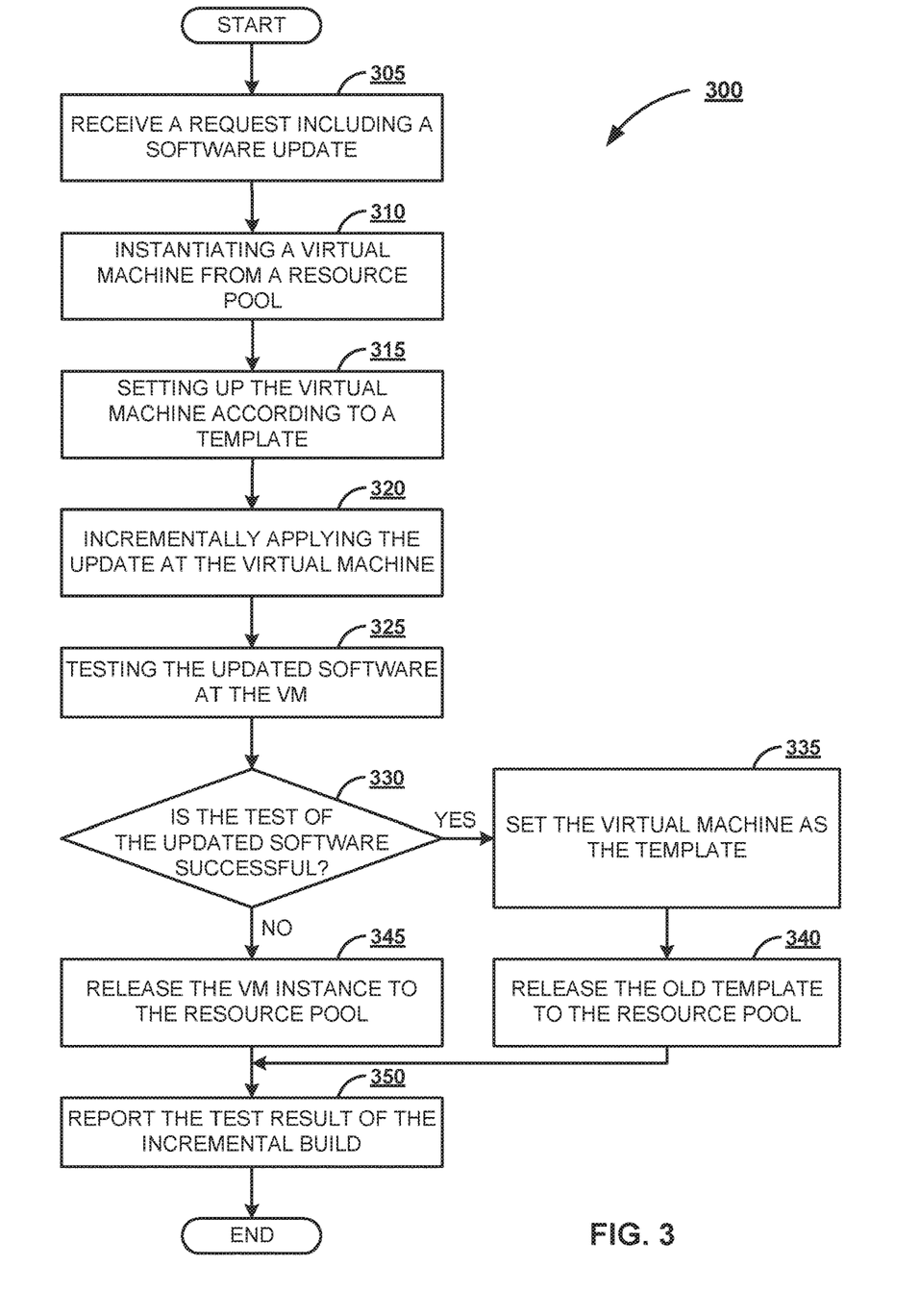
FIG. 3 is a flow diagram illustrating a process of dynamic compilation server cloning, according to one embodiment.

FIG. 3 is a flow diagram showing process 300 of dynamic cloning of compilation servers to support an efficient development process by auto scaling and precise incremental build, according to one embodiment. Process 300 may start at 305 with receiving a request including a software update. The request may be sent by a developer or a test user, via a client system, as part of a distributed development project. The request may be received at a backend system, e.g., a backend server node. Upon receiving the request, a virtual machine may be instantiated from a resource pool, at 310, to handle the compilation, and possibly the testing, of the software update. Thus, a server node would be provided and assigned for managing the submitted software update without unnecessary delay, e.g., waiting a free physical server.

At 315, the virtual machine is setup according to a template. For example, the template may be a set of system and application program and data files corresponding to a server node, including the output files from a latest build of the developed software product. After instantiation, the virtual machine may copy the output files, as well as any additional system and application data to provide the necessary compile and runtime environment for handling the submitted software update. In this way, the instantiated virtual machine would be available and instantiated with the latest build of the software product. Further, at 320, the new changes of the software update are incrementally build upon the existing build. For example, the changes are compared with the output files at the virtual machine, and the affected ones are re-compiled with the software update.

The software update is tested, e.g., at the virtual machine (325), once the incremental build of the software product with the submitted software changes is completed. The testing scenario that is used to check the newly developed functionality may be submitted separately or together with the received request. At 330, it is verified whether the test of the updated software is successful. Once the testing is confirmed as successful, the virtual machine may be set as template (335) and the old template may be released to the resource pool (340). Alternatively, the updated output files of the build at the virtual machine may be copied, or otherwise merged, to replace the corresponding output files of the template. Accordingly, once a new or updated template is setup, the instance of the virtual machine may be released, e.g., killed, to free up the engaged resources. If the test of the new functionality is not successful, the virtual machine instance is released to the resource pool, at 345. The result of the testing may be reported to the developer and/or the test user, at 350.

Process 300 is one example of how to ensure availability of a server node to compile submitted software changes, and further to ensure that the changes will be added to the software product by precise incremental build. Using virtual server nodes allows instantiating a node on demand, whenever is needed, regardless if there are concurrently running other server node instances. Thus, the number of server nodes can be efficiently managed according to the current demand for compilation resources, to avoid delays and wait time for free server nodes. Additionally, instantiating virtual server nodes as clones of a maintained template with the currently latest software product build guarantees that the new changes may be directly applied, without looking up for additional software components, e.g., from other running server nodes. Using virtual server nodes also enable more efficient run of the compilation process on average. The below Table 1 illustrates an example comparison of the compile times between hardware and virtual server nodes, and between rough and precise incremental builds:

TABLE 1

|  | Physical server node<br>CPU: 4 core/3.5 GHz<br>Memory: 16 GB<br>RAM, non-SSD<br>storage | Virtual server node<br>CPU: 27 core/2.5 GHz<br>Memory: 32 GB RAM,<br>SSD storage |
|---|---|---|
| Complete build | 100 min | 67 min |
| Rough incremental build (update 1) | 82 min | 61 min |
| Precise incremental build (update 1) | 34 min | 28 min |
| Rough incremental build (update 2) | 35 min | 61 min |
| Precise incremental build (update 2) | 24 min | 17 min |

The advantage of the flexibility the virtual server nodes provide is further demonstrated in Table 2, showing how on average the compile efficiency improves:

TABLE 2

|  | 110 submissions per week, 15 physical servers CPU: 8 core/3.5 GHz Memory: 16 GB RAM, non-SSD storage | 109 submissions per week, up to 5 VM clones: CPU: 16 core/2.3 GHz Memory: 16 GB RAM, 120 G SSD/Non-SSD mixed storage per build VM) |
|---|---|---|
| Max compile time (complete build) | 257 min | 66 min |
| Min compile time (precise incremental build) | 34 min | 17 min |
| Average compile time | 106 min (78% >60 min; 12% <40 min) | 27 min (15% >60 min; 60% <40 min) |

Figure 4:
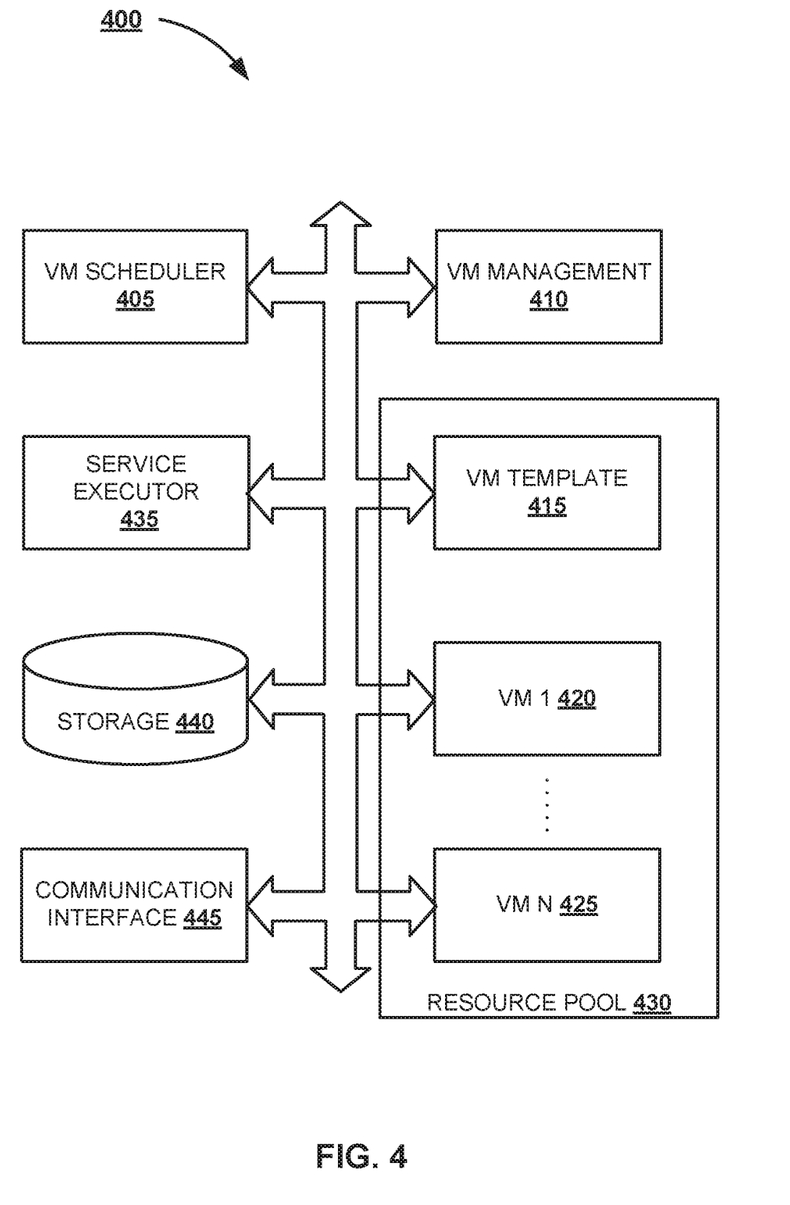
FIG. 4 is a block diagram illustrating a system including main modules to implement virtualization and dynamically clone and release compilers, according to one embodiment.

FIG. 4 shows exemplar backend system 400 including the main modules to implement virtualization and dynamic cloning of compilers, e.g., used to achieve the above presented compile time results. In one embodiment, VM management module 410 may clone and release virtual machines such as VM 1 420 and VM N 425. For example, VM management 410 may call an application programming interface (API) of a server virtualization platform, e.g., such as vSphere® provided by VMware® company, to provide automatic cloning and deleting of VMs from resource pool 430. Further, VM management 410 may automatically update network names/addresses (internet protocol (IP) addresses) and machine names to channel the access to the corresponding virtual server nodes. These VMs (e.g., 420-425) are used as compilers. VM scheduler 405 may assign compilers for specific submissions from developers and send requests to the VM management 410 to ask for cloning, e.g., based on VM template 415, and releasing compilers (VMs 420-425) according to the demand.

Service executor 435 may execute basic compile and test processes of CI/CD pipelines (e.g., SAP Business One® UT service). The service executor 435 may also maintain the status of compilers (VMs 420-425) and the template (VM template 415) used for cloning. For example, the service executor 435 may store the submitted software updates and test scenarios (checklists) on storage 440, e.g., as queues to be polled by the corresponding compilers (build agents and/or test agents). Communication interface module 445 may enable the communication between the different servers of the backend. For example, communication interface 445 may offer one or more APIs supporting respective communication frameworks, such as representational state transfer (REST).

Figure 5:
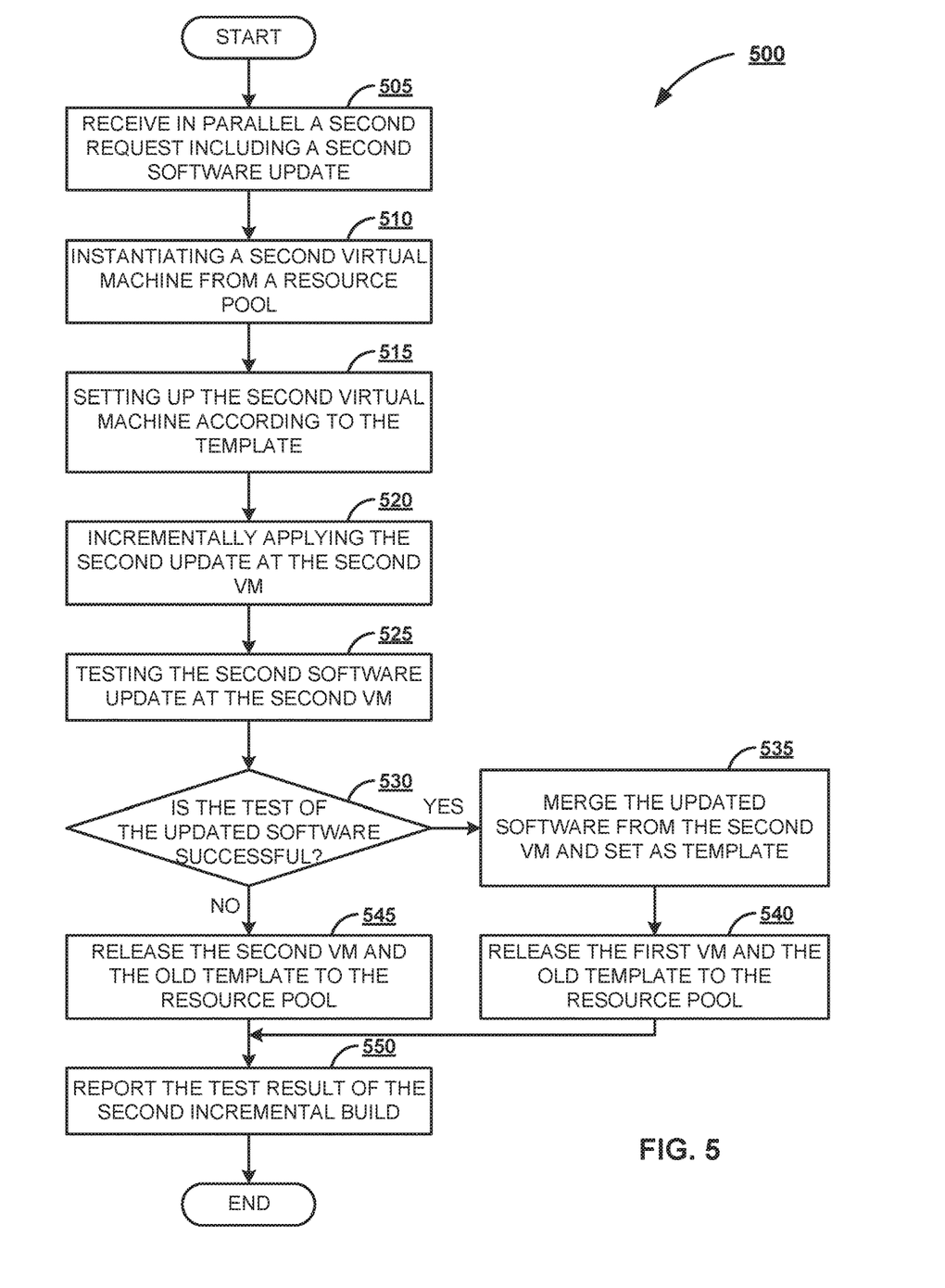
FIG. 5 is a flow diagram illustrating a process of optimized compilation via dynamic server cloning, according to one embodiment.

For efficient compilation, including precise incremental build, it is important that a robust mechanism for parallel processing of software updates, e.g. submitted simultaneously or almost simultaneously by different users. FIG. 5 shows process 500 of optimized compilation via dynamic server cloning when such simultaneous updates are submitted. Process 500 may be easier understood in the context of process 300 presented earlier in relation to FIG. 3. According to one embodiment, at 505 of process 500, a second request is received in parallel to the request received at 305 of process 300 (FIG. 3). The second request includes a second software update to be applied to the software product of the distributed software project.

Upon receiving the second request, a second virtual machine is instantiated, at 510, to handle the compilation and testing of the second software update. Similarly, to the first instantiated virtual machine, the second virtual machine is setup as a cloning of the template, according to the latest successful build of the software product, at 515. The second software update is incrementally applied/built at the second VM (520), and subsequently, tested for correctness, e.g., based on submitted test checklists (525).

At 530, it is verified whether the test of the software update is successful. In other words, and in the context of process 300 (FIG. 3), it may mean that it is verified whether in addition to the successful first software update, the second software update is also successful or not. When the second software update is successful, the updated software product build at the second VM may be merged with the software build at the first VM (535), which would constitute the new merged template for cloning the subsequent VM to handle further software updates. Thus, the new code base line is the second submission. Process 500 continues at 540 with releasing to the resource pool or deleting the first VM, e.g., together with the old template. However, when the second submission is not successful, the second VM may be released to the resource pool, at 545. Process 500 may be deemed complete with reporting the test result of the tested second incremental build, e.g., the second software update, to the submitting user, at 550.

For example, a full build corresponding to a changelist (e.g., software changes) "I" may be generated and stored as a template, e.g., in a DB server. A first developer may submit new software with changelist "I-A" adding new functionality and/or altering some of the functionality according to changelist "I". Upon submitting changelist "I-A", a virtual server compiler is automatically instantiated from the resource pool with the output files corresponding to the build of changelist "I" (e.g., the stored template). If the incremental build corresponding to changelist "I-A" is successfully performed and tested, the changelist "I" relevant compiler, which is the template, should be released and the respective resources will return to the resource pool. The successful incremental build "I-A" may be merged into the template representing the latest successful compilation of the software project (e.g., master branch, according to Git terminology). For example, the compiler that just successfully compiled changelist "I-A" may be set as the template. Then, depending on the software update and test scenarios, multiple virtual servers may be instantiated from the resource pool, cloning the template, to meet the demand. After cloned compilers are used up, new compilers may be cloned from the resource pool, before the previously instantiated compilers be released after finishing respectively assigned compilations. The template would reflect the latest successful compilation (compiler state).

In another example, a full build corresponding to changelist "1500000" is set as a template to provide a platform to setup and clone virtual machines. Thus, the cloned virtual machines and the template would be based on the same build (e.g., "1500000"). A changelist "1500009" based on build "1500000" may be submitted. A cloned virtual machine compiler will be instantiated based on "1500000", the new changes will be applied and tested, and if successful, the new build ("1500009") will replace the template for future cloning. Accordingly, subsequent changelist, e.g., "1500010", would be incrementally build upon "1500009" instead of "1500000", ensuring precise incremental build.

In a scenario where checklists "1500009" and "1500010" are submitted in parallel, two corresponding virtual servers will be instantiated cloning the latest build template (e.g., "1500000"). The parallel builds to respectively "1500009" and "1500010" would be both precise incremental builds. If only one of them is successfully completed and tested, it will be saved as the new template. If both are successful, they may be merged to form the new template. Thus, it can be ensured that at a given time, only one build template is active and available for cloning to handle subsequent one or more precise incremental builds (e.g., "1500011").

Through the dynamic clone and release mechanism as described, precise incremental build compilations may be provided that can significantly reduce average compilation duration within a software development project. Further, better flexibility and utilization of the available computation resources can be achieved, e.g., by dynamically setting the number of simultaneously instantiated compilers.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
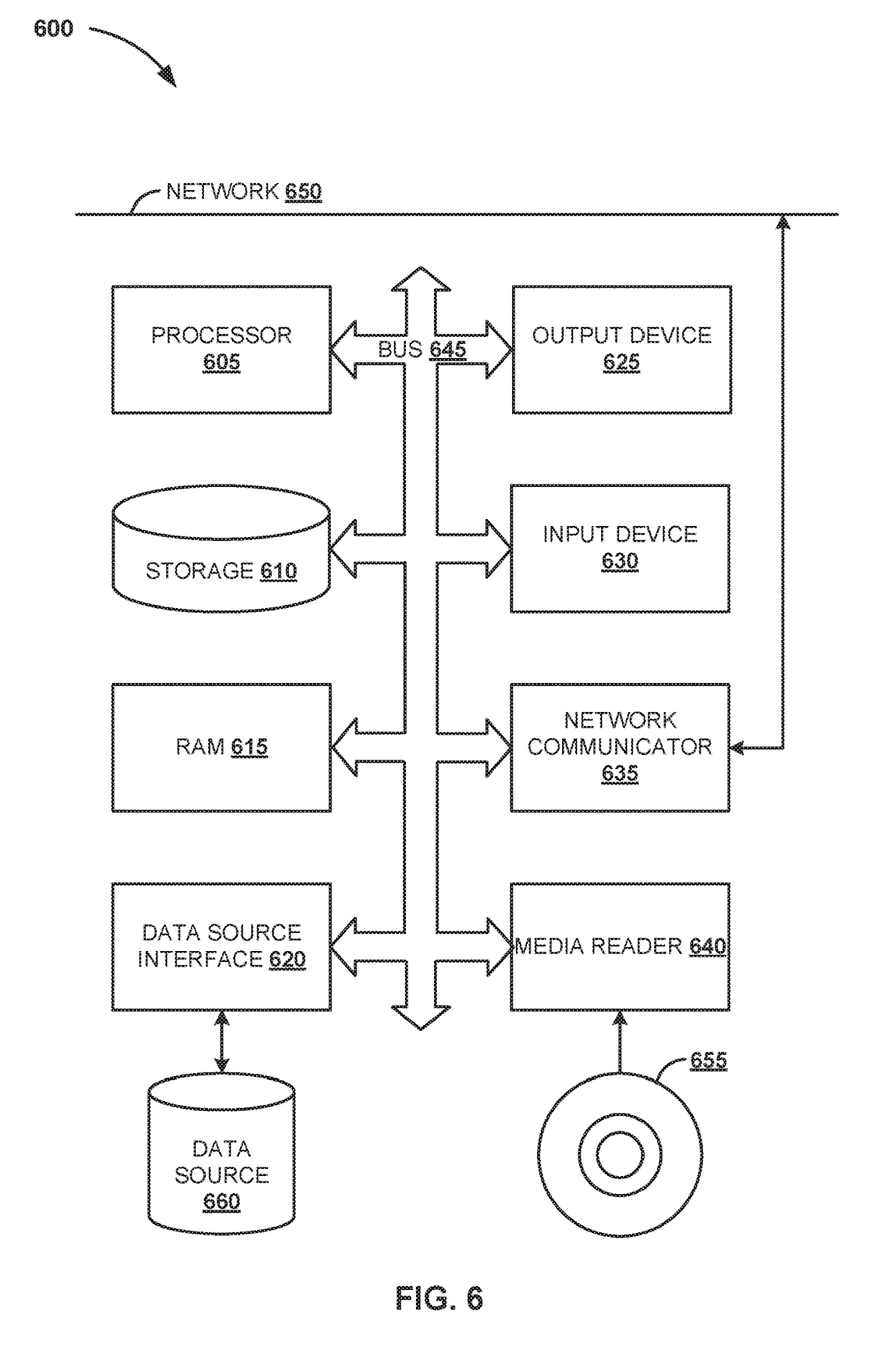
FIG. 6 is a block diagram of an exemplary computer system to execute computer readable instructions for dynamic compilation server cloning, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A non-transitory computer-readable medium to store instructions which, when executed by a computer, cause the computer to perform operations comprising:
   receiving a first compilation request comprising a first update of a software product of a distributed software development project;
   instantiating a first server node clone, based on a server template, wherein the server template corresponds to a latest successful compilation of the software product;
   applying incrementally the first update of the software product on the latest compilation at the first server node clone;
   receiving a second compilation request comprising a second update of the software product;
   instantiating a second server node clone, based on the server template;
   applying incrementally the second update of the software product on the latest compilation at the second server node clone;
   merging the build at the second server node clone with the build at the first server node clone into the server template, when the first update of the software product at the first server node clone is successful and the second update of the software product at the second server node clone is successful; and
   releasing the first server node clone and the second server node clone.

2. The computer-readable medium of claim 1 to store the instructions which, when executed by the computer, cause the computer to perform operations further comprising:
   generating an initial template by performing a full build of the software product.

3. The computer-readable medium of claim 1, wherein receiving the first compilation request comprises:
   storing the first compilation request at a test queue; and
   pulling the second compilation request at the first server node clone from the test queue.

4. The computer-readable medium of claim 3, wherein receiving the second compilation request comprises:
   storing the second compilation request at the test queue; and
   pulling the second compilation request at the first server node clone from the test queue.

5. The computer-readable medium of claim 1, wherein applying incrementally the first update of the software product comprises:
   testing the updated software product at the first server node clone according to a first test scenario.

6. The computer-readable medium of claim 1, wherein applying incrementally the second update of the software product comprises:
   testing the updated software product at the second server node clone according to a second test scenario.

7. A computer implemented method to optimize compilation via dynamic server cloning, comprising:
   receiving, by a processor, a first compilation request comprising a first update of a software product of a distributed software development project;
   instantiating, by the processor, a first server node clone, based on a server template, wherein the server template corresponds to a latest successful compilation of the software product;
   applying incrementally, by the processor, the first update of the software product on the latest compilation at the first server node clone;
   receiving, by the processor, a second compilation request comprising a second update of the software product;
   instantiating, by the processor, a second server node clone, based on the server template;
   applying incrementally, by the processor, the second update of the software product on the latest compilation at the second server node clone;
   merge the build at the second server node clone with the build at the first server node clone into the server template, when the first update of the software product at the first server node clone is successful and the second update of the software product at the second server node clone is successful;
   releasing the first server node clone and the second server node clone.

8. The method of claim 7, further comprising:
   generating an initial template by performing a full build of the software product.

9. The method of claim 7, wherein receiving the compilation request comprises:
   storing the first compilation request at a test queue; and
   pulling the second compilation request at the first server node clone from the test queue.

10. The method of claim 7, wherein applying incrementally the update of the software product comprises:
    testing the updated software product at the first server node clone according to a first test scenario.

11. The method of claim 10 further comprising:
    receiving the first test scenario together with the first compilation request.

12. The method of claim 7, wherein applying incrementally the second update of the software product comprises:
    testing the updated software product at the second server node clone according to a second test scenario.

13. A computer system to compile software updates via dynamic server cloning, comprising:
    a memory storing processor-executable program code; and
    a processor to execute the processor-executable program code to:
        receive a first compilation request comprising a first update of a software product of a distributed software development project;

instantiate a first server node clone, based on a server template, wherein the server template corresponds to a latest successful compilation of the software product;

apply incrementally the first update of the software product on the latest compilation at the first server node clone;

receive a second compilation request comprising a second update of the software product;

instantiate a second server node clone, based on the server template;

apply incrementally the second update of the software product on the latest compilation at the second server node clone;

merge the build at the second server node clone with the build at the first server node clone into the server template, when the first update of the software product at the first server node clone is successful and the second update of the software product at the second server node clone is successful; and release the first server node clone and the second server node clone.

14. The system of claim 13, wherein the processor is to further execute the processor-executable program code to generate an initial template by performing a full build of the software product.

15. The system of claim 13, wherein receiving the first compilation request comprises:
    storing the first compilation request at a test queue; and
    pulling the second compilation request at the first server node clone from the test queue.

16. The system of claim 15, wherein receiving the second compilation request comprises:
    storing the second compilation request at the test queue; and
    pulling the second compilation request at the first server node clone from the test queue.

17. The system of claim 13, wherein applying incrementally the first update of the software product comprises:
    testing the updated software product at the first server node clone according to a first test scenario.

18. The computer-readable medium of claim 1, wherein applying incrementally the second update of the software product comprises:
    testing the updated software product at the second server node clone according to a second test scenario.

* * * * *